(12) United States Patent
Marti (10) Patent No.: US 8,850,347 B2
(45) Date of Patent: Sep. 30, 2014

(54) USER INTERFACE LIST CONTROL SYSTEM

(75) Inventor: Jerry Marti, West Salem, OH (US)

(73) Assignee: Honeywell International Inc., Morristown, NJ (US)

( * ) Notice: Subject to any disclaimer, the term of this patent is extended or adjusted under 35 U.S.C. 154(b) by 479 days.

(21) Appl. No.: 12/895,640

(22) Filed: Sep. 30, 2010

(65) Prior Publication Data

US 2012/0084696 A1 Apr. 5, 2012

(51) Int. Cl.
- *G06F 3/048* (2013.01)
- *G06Q 10/10* (2012.01)
- *G06Q 10/06* (2012.01)

(52) U.S. Cl.
CPC .............. *G06Q 10/06* (2013.01); *G06Q 10/10* (2013.01)
USPC ........................................................ 715/771

(58) Field of Classification Search
USPC ................................... 715/771; 700/883, 276
See application file for complete search history.

(56) References Cited

U.S. PATENT DOCUMENTS

| | | |
|---|---|---|
| 4,375,637 A | 3/1983 | Desjardins |
| 4,816,208 A | 3/1989 | Woods et al. |
| 5,042,265 A | 8/1991 | Baldwin et al. |
| 5,161,387 A | 11/1992 | Metcalfe et al. |
| 5,385,297 A | 1/1995 | Rein et al. |
| 5,390,206 A | 2/1995 | Rein et al. |
| 5,544,036 A | 8/1996 | Brown, Jr. et al. |
| 5,768,119 A | 6/1998 | Havekost et al. |
| 5,929,761 A | 7/1999 | Van der Laan et al. |
| 5,946,303 A | 8/1999 | Watson et al. |
| 5,955,946 A | 9/1999 | Beheshti et al. |
| 6,124,790 A | 9/2000 | Golov et al. |
| 6,141,595 A | 10/2000 | Gloudeman et al. |
| 6,178,362 B1 | 1/2001 | Woolard et al. |
| 6,185,483 B1 | 2/2001 | Drees |
| 6,195,309 B1 | 2/2001 | Ematrudo |
| 6,223,544 B1 | 5/2001 | Seem |

(Continued)

FOREIGN PATENT DOCUMENTS

| | | |
|---|---|---|
| WO | WO 01/97146 | 12/2001 |
| WO | WO 02/052432 | 7/2002 |

(Continued)

OTHER PUBLICATIONS

Honeywell, "Excel Building Supervisor-Integrated R7044 and FS90 Ver. 2.0," Operator Manual, 70 pages, Apr. 1995.

(Continued)

*Primary Examiner* — Phenuel Salomon
(74) *Attorney, Agent, or Firm* — Seager, Tufte, Wickhem LLC (57) ABSTRACT

A user interface list control system having a supervisor user application providing tools to create, deploy, modify and monitor a multi-site enterprise of remote building management systems (BMS). BMS controllers may be configured to control or monitor similar entities across all sites. As site controller configurations are created, the user must identify each configuration item with a recognizable name and/or type tag that indicates function, definition, and/or location of the item. The user may be allowed or required to apply names and type string tags consistently across all multiple site configurations. Within the context of a single supervisor, multiple users may be allowed to utilize common lists of name and type tags. The user may apply an application-specific name and/or type tag to a configuration item, using a drop down list where the user can add a new string to a tag list or select a previously entered string tag.

16 Claims, 7 Drawing Sheets

(56) References Cited

U.S. PATENT DOCUMENTS

| | | | |
|---|---|---|---|
| 6,295,526 B1 | 9/2001 | Kreiner et al. | |
| 6,295,527 B1 | 9/2001 | McCormack et al. | |
| 6,301,624 B1* | 10/2001 | Lee et al. | 719/318 |
| 6,314,328 B1 | 11/2001 | Powell | |
| 6,351,213 B1 | 2/2002 | Hirsch | |
| 6,356,282 B2 | 3/2002 | Roytman et al. | |
| 6,389,464 B1 | 5/2002 | Krishnamurthy et al. | |
| 6,420,968 B1 | 7/2002 | Hirsch | |
| 6,430,712 B2 | 8/2002 | Lewis | |
| 6,466,654 B1 | 10/2002 | Cooper et al. | |
| 6,473,407 B1 | 10/2002 | Ditmer et al. | |
| 6,492,901 B1 | 12/2002 | Ridolfo | |
| 6,535,122 B1 | 3/2003 | Bristol | |
| 6,549,135 B2 | 4/2003 | Singh et al. | |
| 6,643,355 B1 | 11/2003 | Tsumpes | |
| 6,675,591 B2 | 1/2004 | Singh et al. | |
| 6,681,156 B1 | 1/2004 | Weiss | |
| 6,690,980 B2 | 2/2004 | Powell | |
| 6,813,587 B2 | 11/2004 | McIntyre et al. | |
| 6,816,811 B2 | 11/2004 | Seem | |
| 6,832,120 B1 | 12/2004 | Frank et al. | |
| 6,870,141 B2 | 3/2005 | Damrath et al. | |
| 6,879,253 B1 | 4/2005 | Thuillard | |
| 6,892,546 B2 | 5/2005 | Singh et al. | |
| 6,919,809 B2 | 7/2005 | Blunn et al. | |
| 6,947,972 B2 | 9/2005 | Chun | |
| 6,955,302 B2 | 10/2005 | Erdman, Jr. | |
| 6,973,627 B1 | 12/2005 | Appling | |
| 6,990,821 B2 | 1/2006 | Singh et al. | |
| 7,009,510 B1* | 3/2006 | Douglass et al. | 340/531 |
| 7,024,283 B2 | 4/2006 | Bicknell | |
| 7,031,880 B1 | 4/2006 | Seem et al. | |
| 7,062,389 B2 | 6/2006 | Johnson et al. | |
| 7,068,931 B2 | 6/2006 | Tokunaga | |
| 7,069,181 B2 | 6/2006 | Jerg et al. | |
| 7,085,674 B2 | 8/2006 | Iwasawa | |
| 7,107,268 B1* | 9/2006 | Zawadzki et al. | 1/1 |
| 7,113,085 B2 | 9/2006 | Havekost | |
| 7,133,141 B1* | 11/2006 | Abi-Saleh | 358/1.13 |
| 7,171,287 B2 | 1/2007 | Weiss | |
| 7,183,907 B2 | 2/2007 | Simon et al. | |
| 7,206,646 B2* | 4/2007 | Nixon et al. | 700/83 |
| 7,243,044 B2 | 7/2007 | McCalla | |
| 7,250,856 B2 | 7/2007 | Havekost et al. | |
| 7,272,452 B2 | 9/2007 | Coogan et al. | |
| 7,277,018 B2 | 10/2007 | Reyes et al. | |
| 7,320,023 B2* | 1/2008 | Chintalapati et al. | 709/216 |
| 7,345,580 B2 | 3/2008 | Akamatsu et al. | |
| 7,379,997 B2 | 5/2008 | Ehlers et al. | |
| 7,457,869 B2 | 11/2008 | Kernan | |
| 7,460,020 B2 | 12/2008 | Reyes et al. | |
| 7,490,319 B2 | 2/2009 | Blackwell et al. | |
| 7,496,911 B2 | 2/2009 | Rowley et al. | |
| 7,565,225 B2 | 7/2009 | Dushane et al. | |
| 7,596,613 B2 | 9/2009 | Silverthorne et al. | |
| 7,644,371 B2 | 1/2010 | Robertson et al. | |
| 7,653,459 B2 | 1/2010 | Pouchak et al. | |
| 7,734,572 B2 | 6/2010 | Wiemeyer et al. | |
| 7,774,457 B1 | 8/2010 | Talwar et al. | |
| 7,782,302 B2* | 8/2010 | Lee et al. | 345/167 |
| 7,819,334 B2 | 10/2010 | Pouchak et al. | |
| 7,826,929 B2 | 11/2010 | Wacker | |
| 7,900,228 B2* | 3/2011 | Stark et al. | 725/45 |
| 8,078,481 B2* | 12/2011 | Steinbarth et al. | 705/4 |
| 8,090,477 B1 | 1/2012 | Steinberg | |
| 8,112,162 B2 | 2/2012 | Pouchak et al. | |
| 8,190,273 B1 | 5/2012 | Federspiel et al. | |
| 8,218,570 B2 | 7/2012 | Moran et al. | |
| 8,224,466 B2 | 7/2012 | Wacker | |
| 8,224,763 B2 | 7/2012 | Guralnik et al. | |
| 8,224,888 B2 | 7/2012 | Brindle | |
| 8,239,500 B2 | 8/2012 | Pouchak | |
| 8,335,593 B2 | 12/2012 | Johnson et al. | |
| 8,352,047 B2 | 1/2013 | Walter | |
| 2002/0152298 A1 | 10/2002 | Kikta et al. | |
| 2003/0078677 A1 | 4/2003 | Hull et al. | |
| 2003/0101009 A1 | 5/2003 | Seem | |
| 2003/0171851 A1 | 9/2003 | Brickfield et al. | |
| 2004/0143510 A1 | 7/2004 | Haeberle et al. | |
| 2004/0230328 A1 | 11/2004 | Armstrong et al. | |
| 2005/0038571 A1 | 2/2005 | Brickfield et al. | |
| 2005/0043862 A1 | 2/2005 | Brickfield et al. | |
| 2005/0143863 A1 | 6/2005 | Ruane et al. | |
| 2005/0193285 A1 | 9/2005 | Jeon | |
| 2005/0203490 A1 | 9/2005 | Simonson | |
| 2005/0222889 A1 | 10/2005 | Lai et al. | |
| 2006/0020962 A1* | 1/2006 | Stark et al. | 725/32 |
| 2006/0038672 A1 | 2/2006 | Schoettle | |
| 2006/0064305 A1* | 3/2006 | Alonso | 705/1 |
| 2006/0069986 A1* | 3/2006 | Sandoval | 715/517 |
| 2006/0095835 A1* | 5/2006 | Kennedy et al. | 715/513 |
| 2006/0136558 A1 | 6/2006 | Sheehan et al. | |
| 2006/0168013 A1 | 7/2006 | Wilson et al. | |
| 2006/0253205 A1 | 11/2006 | Gardiner | |
| 2007/0055698 A1* | 3/2007 | McCoy et al. | 707/104.1 |
| 2007/0061046 A1* | 3/2007 | Mairs et al. | 700/275 |
| 2007/0198674 A1 | 8/2007 | Li et al. | |
| 2008/0010049 A1 | 1/2008 | Pouchak et al. | |
| 2008/0189162 A1 | 8/2008 | Ganong et al. | |
| 2009/0113037 A1 | 4/2009 | Pouchak | |
| 2010/0106543 A1 | 4/2010 | Marti | |
| 2010/0131653 A1 | 5/2010 | Dharwada et al. | |
| 2010/0131877 A1 | 5/2010 | Dharwada et al. | |
| 2010/0198651 A1 | 8/2010 | Johnson et al. | |
| 2010/0286937 A1 | 11/2010 | Hedley et al. | |
| 2011/0010654 A1 | 1/2011 | Raymond et al. | |
| 2011/0083077 A1 | 4/2011 | Nair et al. | |
| 2011/0093493 A1 | 4/2011 | Nair et al. | |
| 2011/0098863 A1 | 4/2011 | Miki | |
| 2011/0113360 A1 | 5/2011 | Johnson et al. | |
| 2011/0196539 A1 | 8/2011 | Nair et al. | |
| 2011/0225580 A1 | 9/2011 | Nair et al. | |
| 2011/0298608 A1 | 12/2011 | Ranjan et al. | |
| 2011/0316688 A1 | 12/2011 | Ranjan et al. | |
| 2012/0005731 A1 | 1/2012 | Lei et al. | |
| 2012/0166992 A1 | 6/2012 | Huynh et al. | |

FOREIGN PATENT DOCUMENTS

| | | |
|---|---|---|
| WO | WO 03/090038 | 10/2003 |
| WO | WO 2004/053772 | 6/2004 |
| WO | WO 2004/055608 | 7/2004 |
| WO | WO 2004/070999 | 8/2004 |
| WO | WO 2005/020167 | 3/2005 |
| WO | WO 2006/048397 | 5/2006 |
| WO | WO 2007/024622 | 3/2007 |
| WO | WO 2007/024623 | 3/2007 |
| WO | WO 2007/027685 | 3/2007 |
| WO | WO 2007/082204 | 7/2007 |

OTHER PUBLICATIONS

Trane, "System Programming, Tracer Summit Version 14, BMTW-SVP01D-EN," 623 pages, 2002.
U.S. Appl. No. 12/895,609, filed Sep. 30, 2010.
Tridium, "Tridium & Niatara Framework Overview," 9 pages, prior to Oct. 28, 2008.
Tridium, "NiagaraAX Product Model Overview," 7 pages, 2005.
Adobe Acrobat 6.0 Standard, Version 6.0.2, Screenshots, 2 pages, May 18, 2004.
Atere-Roberts et al., "Implementation of a Computerized Maintenance Management System for the City of Atlanta," 13 pages, Proceedings of the Water Environment Federation, Jan. 1, 2002.
Business Objects, Crystal Reports Access, Format, and Integrate Data, 4 pages, Dec. 2003.
U.S. Appl. No. 13/402,780, filed Feb. 22, 2012.
U.S. Appl. No. 13/657,620, filed Oct. 22, 2012.
Honeywell Spyder Bacnet User's Guide, 242 pages, Revised Jul. 2009.
Honeywell Spyder User's Guide 202 pages, Released Jul. 2007.
Honeywell, "ComfortPoint Open BMS Release 100," Specification and Technical Data, 13 pages, Jun. 2012.

(56) References Cited

OTHER PUBLICATIONS

Honeywell, "Excel 15B W7760B Building Manager," User's Guide, 84 pages, Revised Jan. 2005.
http://blogs.msdn.com/b/khen1234/archive/2005/05/11/416392.aspx, "Regular Expressions in T-SQL," 4 pages, May 11, 2005.
http://en.wikipedia.org/wiki/JAR_(file_format), "JAR (file Format)—Wikipedia, the Free Encyclopedia," 3 pages, printed Dec. 26, 2009.
http://www.de2m.com/DE2R_Technical.html, "Data Enabled Enterprise Repository (DE2R) Technical Overview," 4 pages, printed Mar. 8, 2013.
http://www.google.com/maps, "Google Maps, Pin Location," 1 page, prior to Nov. 21, 2008.
Johnson Controls, "Fx Workbench, User's Guide," 818 pages, issued May 19, 2008.
Microsoft Word Screen Shots, 2 pages, prior to Nov. 21, 2008.
Novar, "Opus Supervisor User Guide," pp. 1-159, Feb. 1, 2012.
Novar, "Demand Response, Program Implementation and Execution," 8 pages, Oct. 28, 2008.
Novar, "Media Backgrounder," 10 pages, prior to Feb. 22, 2012.
Siemens, BACnet for DESIGO 27 pages, prior to Dec. 30, 2009.

* cited by examiner

USER INTERFACE LIST CONTROL SYSTEM

BACKGROUND

The invention pertains site controllers and particularly to identifying items of the controllers in a systematic manner.

SUMMARY

The disclosure reveals a user interface list control system having a supervisor user application providing tools to create, deploy, modify and monitor a multi-site enterprise of remote building management systems (BMS). BMS controllers may be configured to control or monitor similar entities across all sites. As site controller configurations are created, the user must identify each configuration item with a recognizable name and/or type tag that indicates function, definition, and/or location of the item. The user may be allowed or required to apply names and type string tags consistently across all multiple site configurations. Within the context of a single supervisor, multiple users may be allowed to utilize common lists of name and type tags. The user may apply an application-specific name and/or type tag to a configuration item, using a drop down list where the user can add a new string to a tag list or select a previously entered string tag.

DESCRIPTION

An OPUS supervisor user application may provide a user the functions to easily create, deploy, modify and monitor a multi-site enterprise of remote OPUS building management systems (BMS). These multiple site BMS controllers may be configured to control or monitor similar entities across all the sites. As the site controller configurations are created, the user must identify each configuration item with a recognizable name and/or type tag that clearly identifies the function, the definition, or the location of the entity. The types of entities that need the name or type tags may be control subsystems, schedules, alarm types or site categories. A desired outcome is that all sites are configured in a consistent manner and that the names and type tags used are the same across all of the enterprise sites. For example, if the BMS controls the lights in the parking lot, the control entity should be consistently identified as "PARKING LIGHTS". With related technology, the user application would provide multiple approaches to allow the user to name these entities. These approaches would in virtually all cases provide a user interface text box that is free form allowing the user to type in the desired name or type specification. An issue with related technology may pertain to the user interface options of applying the name and type tags. The user must rely on best practice to always apply the tags in a consistent manner and must always remember to reuse the names or types used in the other site configurations. An issue may be that over time, users applying name and type tags will begin to divert from using consistent naming and the sites will have similar naming but not exact naming. An issue with this scenario is that the NOVAR enterprise tools ALARM PRO and TOOLSET can only perform their functions across the multiple sites when the tagging is exactly the same from all sites. Also, the enterprise tools specifically require that the alarm types and the history point group names be set from a predefined (factory) list of known string tags.

The present disclosure may reveal a user interface tagging component that may allow user to apply names and type string tags in a consistent manner across all the multiple site configurations. This new component will operate within the context of a single OPUS supervisor allowing multiple users to utilize the common lists of name and type tags. The new component will provide an approach for the user to add an application specific name and/or type tag to a configuration item using a drop down list component where the user can either add the new string to a tag list or select a previously entered string tag from the list. By using this new component, the user may establish the desired names and types within the drop down lists when configuring the initial enterprise sites. As subsequent sites are configured, the names and types will already be available in the drop down lists for the user to select and reuse. Using this new component may solve two issues. The first is that the approach for attaching the identifying tag to a configuration item is consistent and secondly the actual identifying string tags will be consistent across all sites if the users utilize the string tags from the drop down list.

The new UI component may have two parts, a hidden list component and a list selector component. The list component part may be a hidden string array that will be the data storage location of the string tags. The list selector component part may be a UI combination text entry and drop down list selection component. The UI list selector component may be programmatically connected to use an application specific hidden string array component as a data source.

This new component may be a general purpose base component implementation that is not necessarily applied to the configuration directly by the user. The new base component may be extended as application specific components used to configure specific application entities. The extended components may be selectable by the user as identifiers to tag configuration items. For example, the new base component may be used as a basis by OPUS application configuration components. The components may incorporate 1) OPUS control entity (name and type select), 2) OPUS schedule entity (name select), 3) OPUS alarm extensions (alarm type select), 4) OPUS history extensions (point group select), 5) site categories (type and name select), and 6) customer custom UI food service selector These components are available in an OPUS supervisor palette for use in configuring site configurations. Each component type has a hidden string list array embedded in the OPUS supervisor station. As each component is added to the appropriate configuration item, when the component is used the drop down list is populated in the user interface. The user may add a new string entry or select an existing string. The selection may be attached to the configuration item. Some of the lists, such as the alarm types, may be pre-populated (hard coded) with read-only names or types. User entered name or type strings may be deleted from the lists as needed. The predefined items cannot necessarily be deleted.

Figure 1:
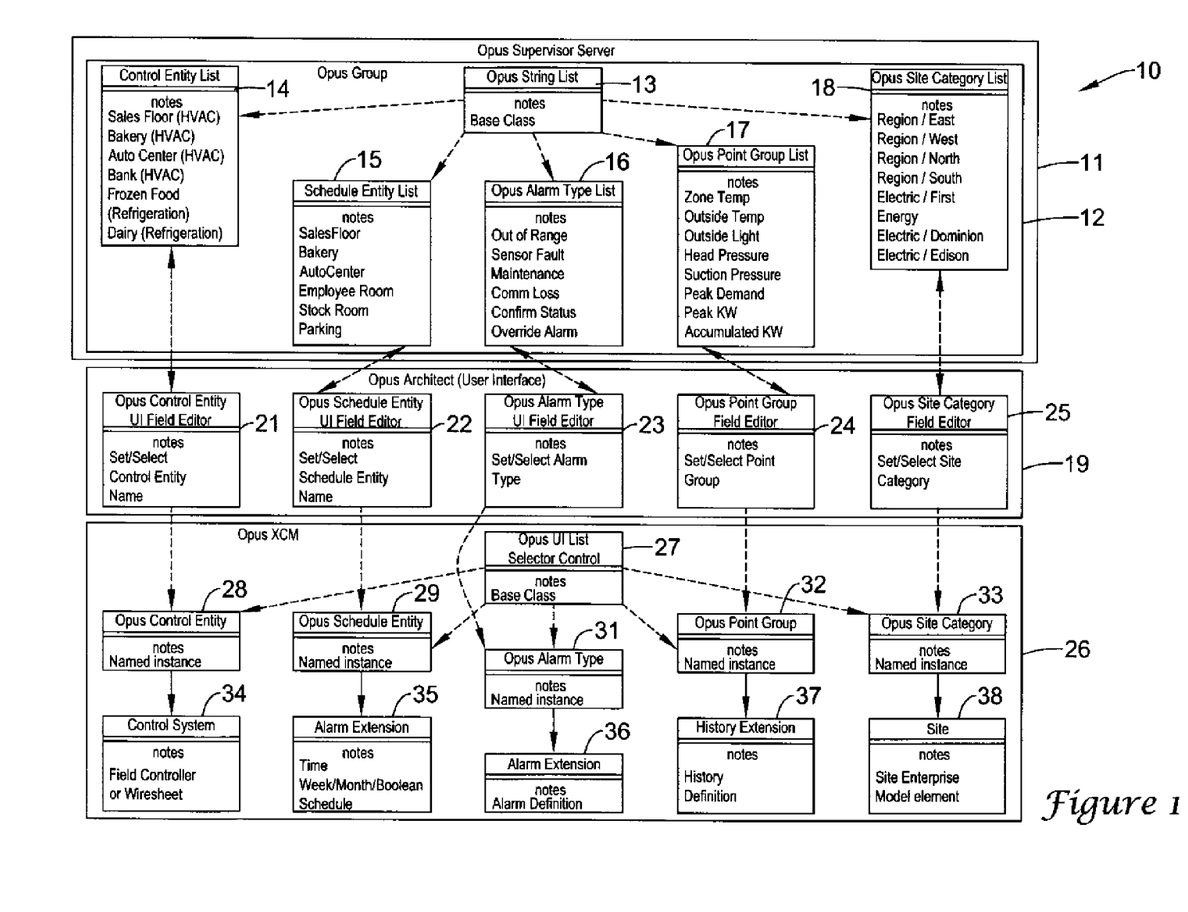
FIG. 1 is a diagram of significant components and architecture of the a user interface list control system.

FIG. 1 is a diagram of significant components and architecture of the OPUS user interface list control system 10. The diagram may be divided into three domains, the OPUS supervisor server 11, OPUS architect user interface client 19, and the OPUS XCM controller 26.

The OPUS supervisor server 11 may provide the data store for the list set for each OPUS group 12. Each group 12 within the OPUS supervisor server 11 may have its own private list set. A list set may consist of a control entity list 14, schedule entity list 15, OPUS alarm type list 16, OPUS point group list 17 and the OPUS site category list 18. The lists may contain string entries either pre-populated by the supervisor or entered by the user. The string lists may be persisted with the OPUS supervisor server 11 allowing the entries to be re-used for each new XCM configuration.

The OPUS architect 19 is the user interface client that the user operates to configure the XCM controller 26. The application may provide the OPUS user list control field editors 21-25 tailored specific to each of the lists maintained in the OPUS supervisor server 11. These field editors 21-25 may have the form of a UI combo box providing a text entry field and a drop down list. The field editor may provide the user capability to apply the correct name and type properties to select configuration items within the OPUS XCM controller 26. The field editor may populate the drop down box with the available items in the list. The user may have the option of selecting any item in the list or entering a new string to the list and applying it to the XCM 26 configuration.

The OPUS XCM controller 26 may be the host of the target configuration that the user is creating. The user may attach named instances of the control entity 28, schedule entity 29, OPUS alarm extension 36, OPUS history extension 37 and the OPUS site category 33 to a target configuration item. Each of these components may be related directly to the OPUS user list control field editors 21-25 in the OPUS architect 19. When the user applies the desired name, it may be applied as an attached property within the OPUS XCM 26 configuration.

To reiterate, the diagram of FIG. 1 relates to a composite structure naming list framework 10, or in other terms, the OPUS user interface list control 10. Three major components may be the OPUS supervisor server 11, having one or more OPUS groups 12, an OPUS architect (user interface) 19 for the respective group 12, and an OPUS XCM controller 26.

An OPUS group 12 may incorporate an OPUS string list 13. List 13 may involve a base class. From list 13, there may be a control entity list 14, a schedule entity list 15, an OPUS alarm type list 16, an OPUS point group list 17 and an OPUS site category list 18.

Examples of items in the control entity list 14 may incorporate a sales floor HVAC, baking HVAC, auto center HVAC, bank HVAC, frozen food refrigeration, dairy refrigeration, and so forth. Examples of items in the schedule entity list 15 may incorporate a sales floor, bakery, auto center, employee room, stock room, parking, and so forth. Examples of items in the OPUS alarm type list 16 may incorporate out of range, sensor fault, maintenance, communication loss, confirm status, override alarm, and so forth. Examples of items in the OPUS point group list 17 may incorporate zone temperature, outside temperature, outside light, head pressure, suction pressure, peak demand, peak KW, accumulated KW, and so forth. Examples of items in the OPUS site category list 18 may incorporate region/east, region/west, region/north, region/south, electric/First Energy, electric/Dominion, electric/Edison, and so forth.

An OPUS architect (user interface) 19 may incorporate an OPUS control entity UI field editor 21, an OPUS schedule entity UI field editor 22, an OPUS alarm type UI field editor 23, an OPUS point group field editor 24, and an OPUS site category field editor 25. OPUS control entity UI field editor 21 may have a two-way interaction with control entity list 14, and may pertain to a set/select control entity name.

OPUS schedule entity UI field editor 22 may have a two-way interaction with schedule entity list 15, and may pertain to a set/select schedule entity name. OPUS alarm type UI field editor 23 may have a two-way interaction with OPUS alarm type list 16, and may pertain to a set/select alarm type. OPUS point group field editor 24 may have a two-way interaction with OPUS point group list 17, and may pertain to a set/select point group. OPUS site category field editor 25 may have a two-way interaction with OPUS site category list 18, and may pertain to a set/select site category.

OPUS XCM controller 26 may have an OPUS UI selector control 27 which may involve a base class. From control 27, there may be an OPUS control entity 28, OPUS schedule entity 29, OPUS alarm type 31, OPUS point group 32, and OPUS site category 33. OPUS control entity 28 may have an input from OPUS control entity UI field editor 21, and may pertain to a name instance. OPUS schedule entity 29 may have an input from OPUS schedule entity UI field editor 22, and may pertain to a named instance. OPUS alarm type 31 may have an input from OPUS alarm type UI field editor 23, and may pertain to a named instance. OPUS point group 32 may have an input from OPUS point group field editor 24, and may pertain to a named instance. OPUS site category 33 may have an input from OPUS site category field editor 25, and may pertain to a named instance.

A control system 34 may receive an input from OPUS control entity 28, and relate to a field controller or wire sheet. A schedule 35 may receive an input from OPUS schedule entity 29, and relate to a time and a week/month/Boolean schedule. An alarm extension 36 may receive an input from OPUS alarm type 31, and relate to an alarm definition. A history extension 37 may receive an input from OPUS point group 32, and relate to a history definition. Site 38 may receive an input from OPUS site category 33, and relate to a site Enterprise model element.

The component at symbol 13 and symbol 27 may be extended to support naming a new configuration component. An existing field editor component, such as, for example, OPUS control entity UI field editor at symbol 21, may be copied and modified to relate to the new configuration component.

The OPUS user interface list control is a general purpose design consisting of base components that may be extended and modified to support this same naming functionality for new component types created in future implementations. The current implementation may apply the OPUS user list control feature to control entities, schedule entities, alarm types, point groups and site categories.

Figure 2:
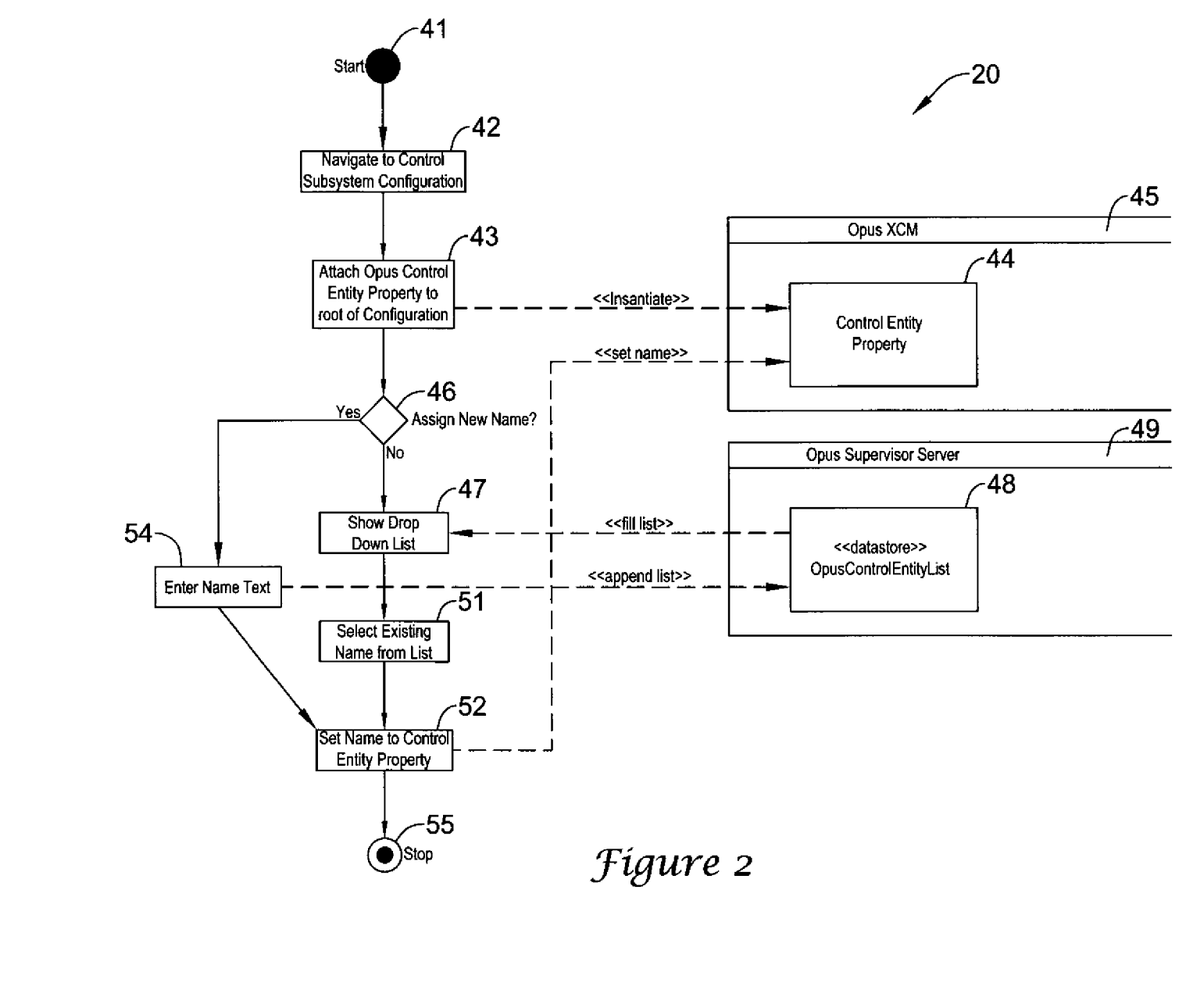
FIGS. 2, 3, 4, 5 and 6 are diagrams of a user interface and data flow for a user interface list control to set control entity, schedule entity, alarm type, history point group and site category names, respectively.

FIG. 2 is a diagram 20 which provides a user interface flow and data flow for using the OPUS user interface list control to set the OPUS control entity 14 name. This flow may be similar for the OPUS schedule entity 15, alarm type 16, history point group 17 and OPUS site category 18 names, as shown in diagrams 30, 40, 50 and 60 of FIGS. 3, 4, 5 and 6, respectively. Theses diagrams may relate to act naming and the OPUS architect client.

There may be a start 41 with navigation to a control subsystem configuration at symbol 42. An OPUS control entity property may be attached to a root of the subsystem configuration at symbol 43. The control entity may be instantiated at control entity property 44 in OPUS XCM 45. A question of assigning a new name may be asked at symbol 46. If the answer is no, then a drop down list is shown at symbol 47. The list may be filled from a data store OPUS control entity list 48 in the OPUS supervisor server 49. An existing name may be selected from the list at symbol 51. The name may be set to the control entity property at symbol 52. The set name may be provided to control entity property 44 at OPUS XCM 45. After symbol 52, then the approach may come to a stop 55.

However, if the answer to the question at symbol 46 of assigning a new name is yes, then the name text may be entered at symbol 54. The OPUS control entity list 48 at OPUS supervisor server 49 may be appended with the new name from symbol 54. The name from symbol 54 may be set to the control entity property at symbol 52. The set name may be provided to control entity property 44 at OPUS XCM 45. After symbol 52, then the approach may come to a stop 55.

Figure 3:
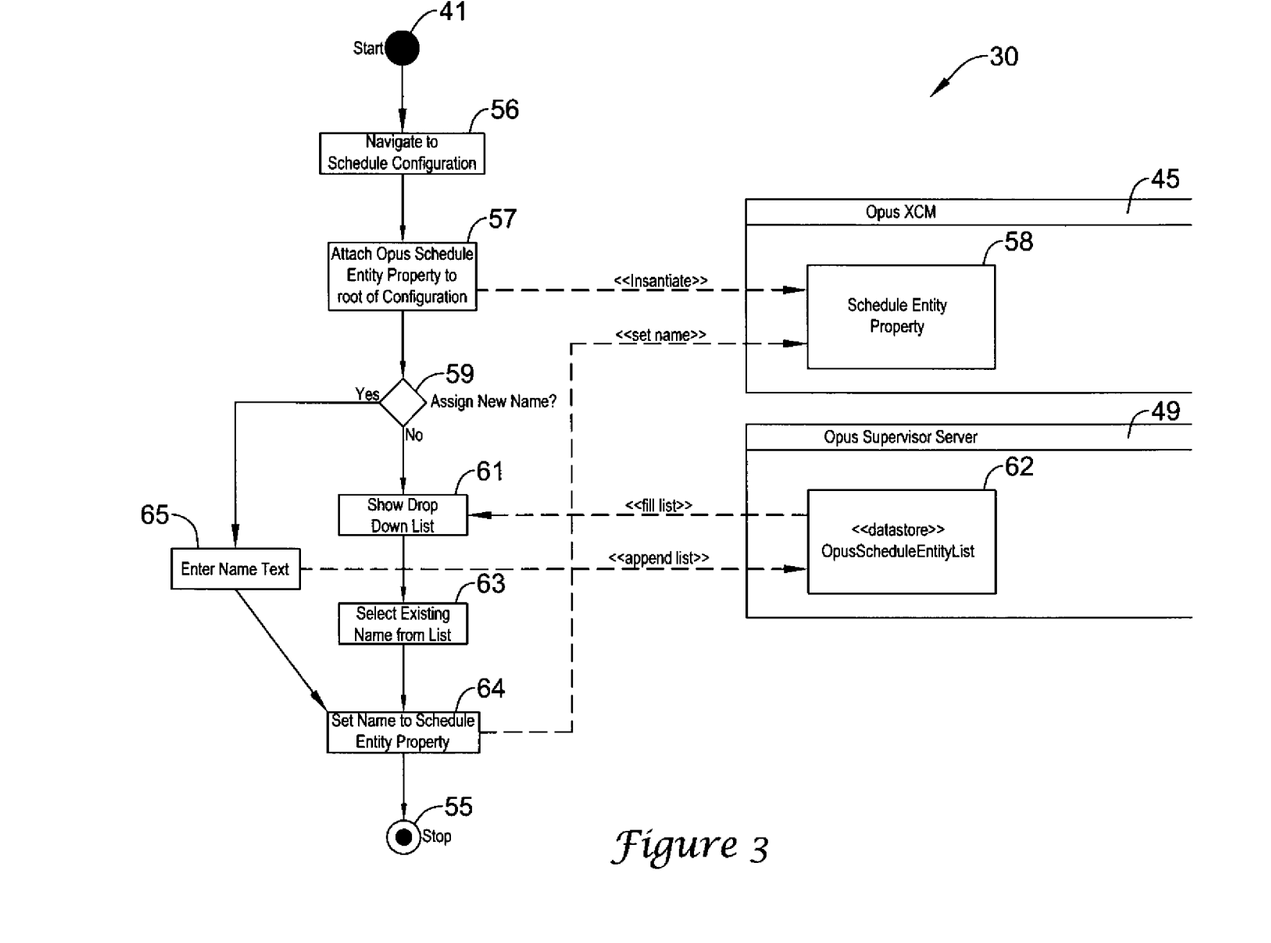

FIG. 3 is a diagram 30 which provides a user interface flow and data flow for using the OPUS user interface list control to set the OPUS schedule entity 15 name. There may be a start 41 with navigation to a schedule subsystem configuration at symbol 56. An OPUS schedule entity property may be attached to a root of the subsystem configuration at symbol 57. The schedule entity may be instantiated at schedule entity property 58 in OPUS XCM 45. A question of assigning a new name may be asked at symbol 59. If the answer is no, then a drop down list is shown at symbol 61. The list may be filled from a data store OPUS schedule entity list 62 in the OPUS supervisor server 49. An existing name may be selected from the list at symbol 63. The name may be set to the schedule entity property at symbol 64. The set name may be provided to schedule entity property 58 at OPUS XCM 45. After symbol 64, then the approach may come to a stop 55.

However, if the answer to the question at symbol 59 of assigning a new name is yes, then the name text may be entered at symbol 65. The OPUS schedule entity list 62 at OPUS supervisor server 49 may be appended with the new name from symbol 65. The name from symbol 65 may be set to the schedule entity property at symbol 64. The set name may be provided to schedule entity property 58 at OPUS XCM 45. After symbol 64, then the approach may come to a stop 55.

Figure 4:
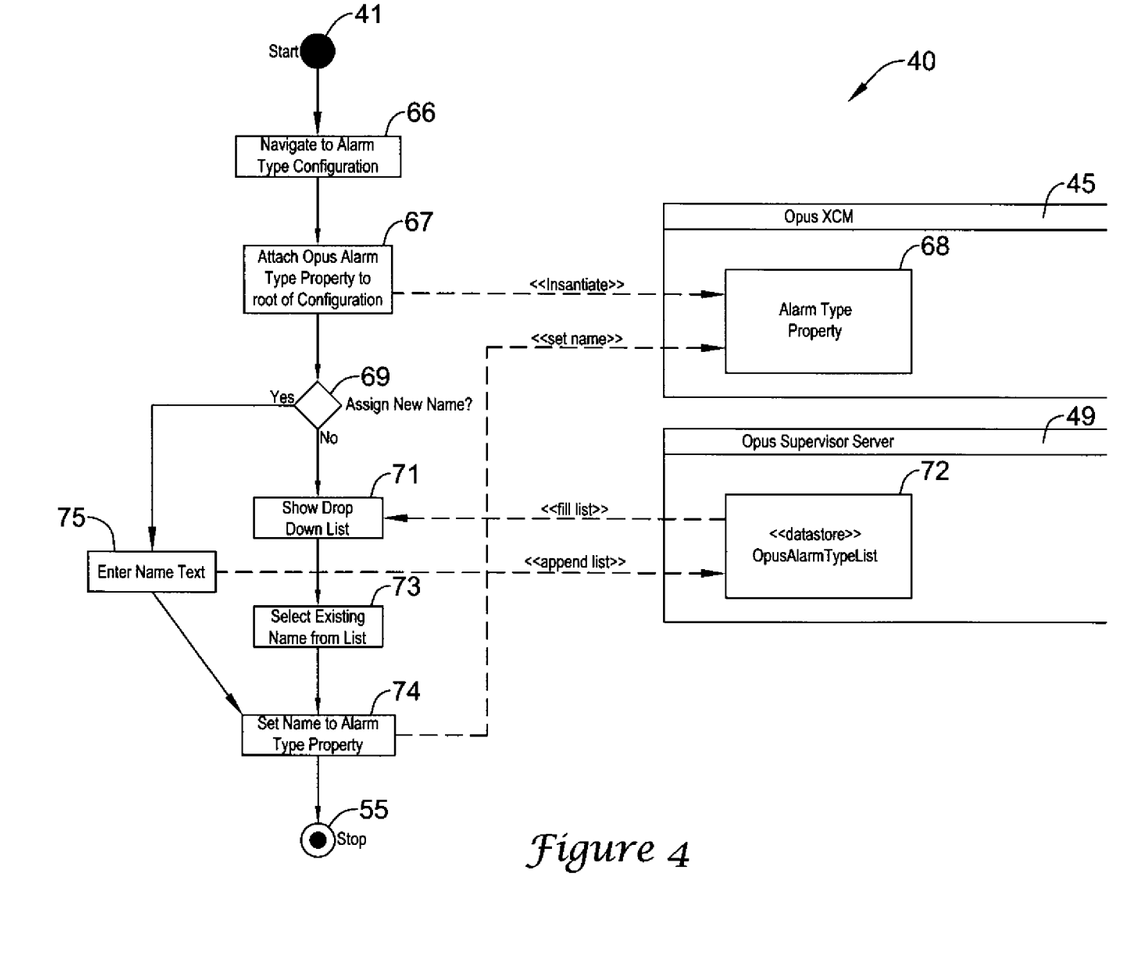

FIG. 4 is a diagram 40 which provides a user interface flow and data flow for using the OPUS user interface list control to set the OPUS alarm type 16 name. There may be a start 41 with navigation to an alarm subsystem configuration at symbol 66. An OPUS alarm type property may be attached to a root of the subsystem configuration at symbol 67. The alarm type may be instantiated at alarm type property 68 in OPUS XCM 45. A question of assigning a new name may be asked at symbol 69. If the answer is no, then a drop down list is shown at symbol 71. The list may be filled from a data store OPUS alarm type list 72 in the OPUS supervisor server 49. An existing name may be selected from the list at symbol 73. The name may be set to the alarm type property at symbol 74. The set name may be provided to alarm type property 68 at OPUS XCM 45. After symbol 74, then the approach may come to a stop 55.

However, if the answer to the question at symbol 69 of assigning a new name is yes, then the name text may be entered at symbol 75. The OPUS alarm type list 72 at OPUS supervisor server 49 may be appended with the new name from symbol 75. The name from symbol 75 may be set to the alarm type property at symbol 74. The set name may be provided to alarm type property 68 at OPUS XCM 45. After symbol 74, then the approach may come to a stop 55.

Figure 5:
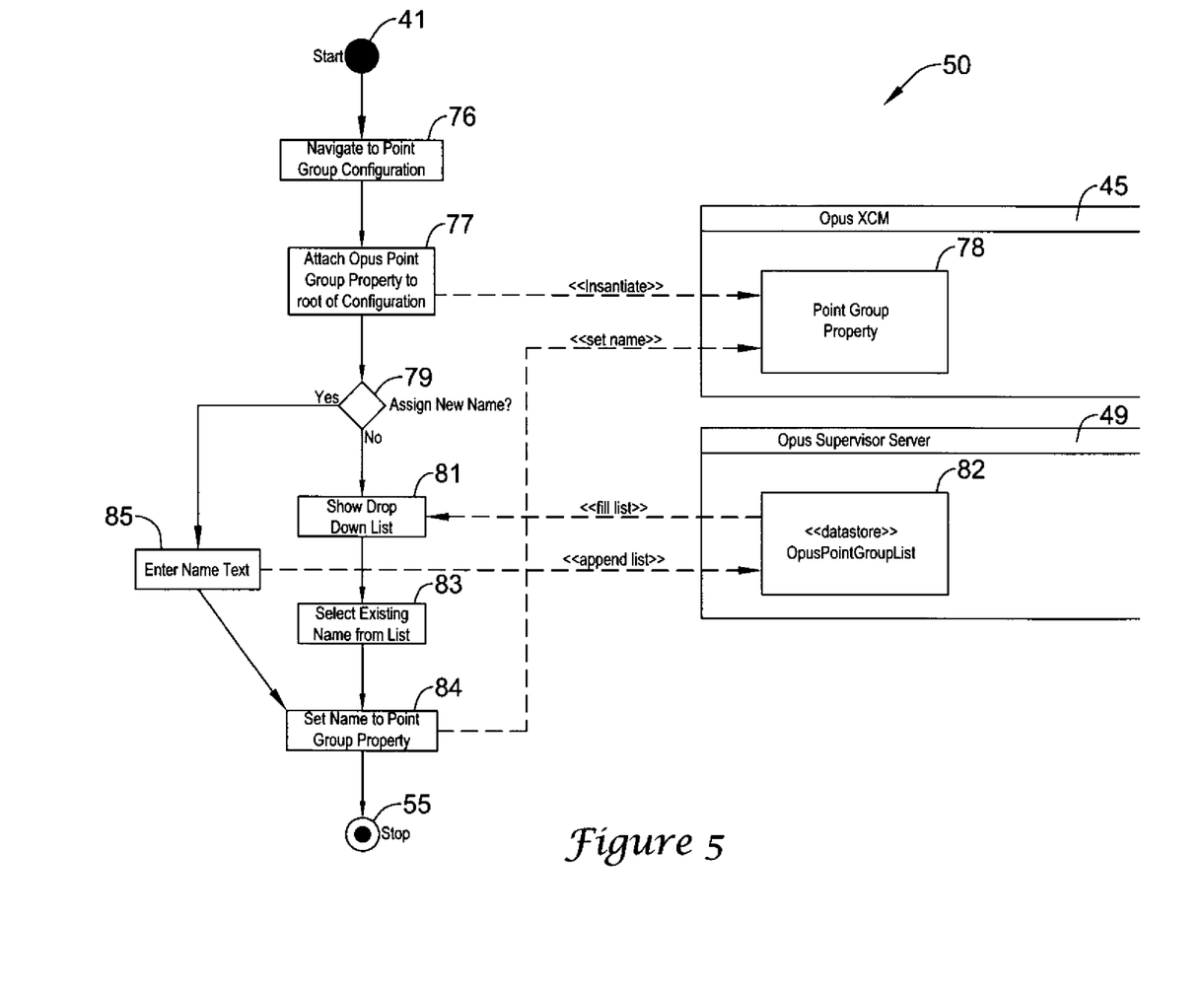

FIG. 5 is a diagram 50 which provides a user interface flow and data flow for using the OPUS user interface list control to set the OPUS point group 17 name. There may be a start 41 with navigation to a point subsystem configuration at symbol 76. An OPUS point group property may be attached to a root of the subsystem configuration at symbol 77. The point group may be instantiated at point group property 78 in OPUS XCM 45. A question of assigning a new name may be asked at symbol 79. If the answer is no, then a drop down list is shown at symbol 81. The list may be filled from a data store OPUS point group list 82 in the OPUS supervisor server 49. An existing name may be selected from the list at symbol 83. The name may be set to the point group property at symbol 84. The set name may be provided to point group property 78 at OPUS XCM 45. After symbol 84, then the approach may come to a stop 55.

However, if the answer to the question at symbol 79 of assigning a new name is yes, then the name text may be entered at symbol 85. The OPUS point group list 82 at OPUS supervisor server 49 may be appended with the new name from symbol 85. The name from symbol 85 may be set to the point group property at symbol 84. The set name may be provided to point group property 78 at OPUS XCM 45. After symbol 84, then the approach may come to a stop 55.

Figure 6:
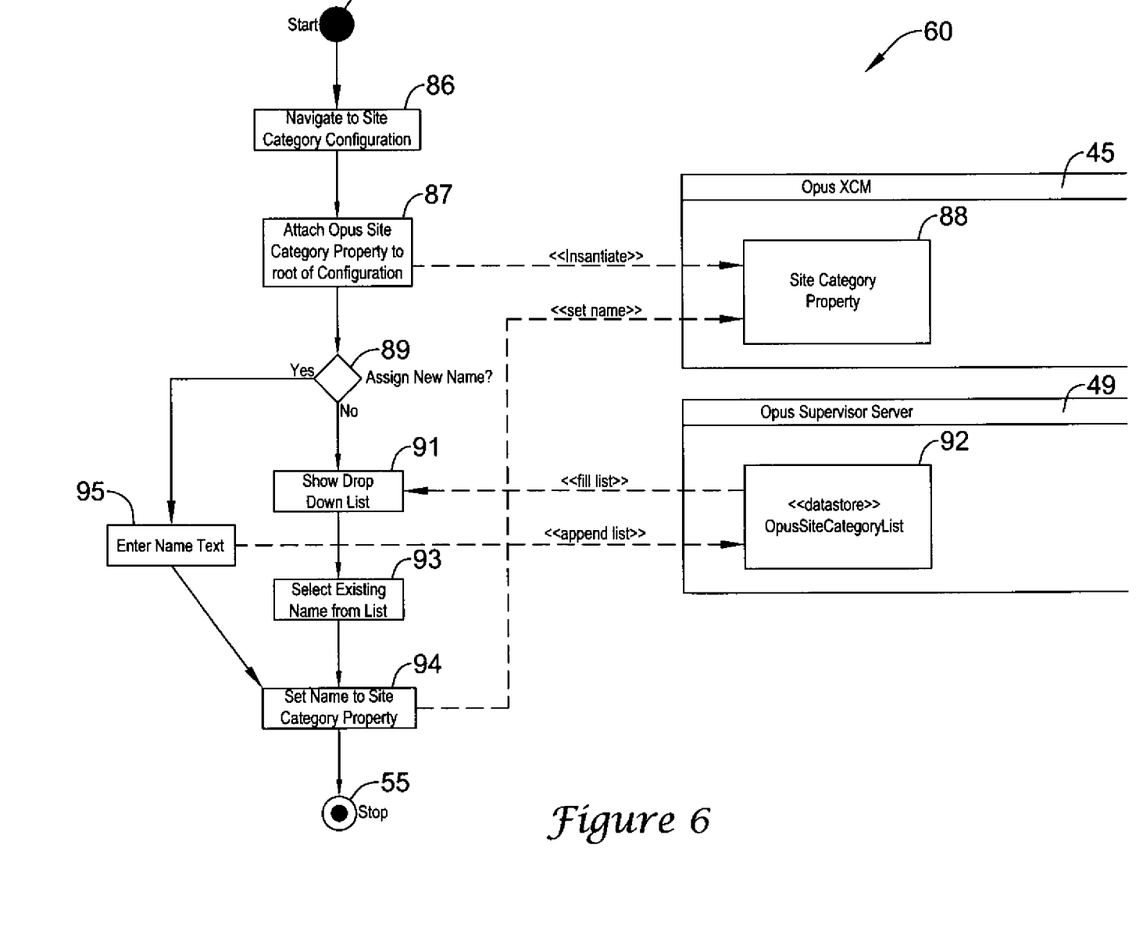

FIG. 6 is a diagram 60 which provides a user interface flow and data flow for using the OPUS user interface list control to set the OPUS site category 18 name. There may be a start 41 with navigation to a site category configuration at symbol 86. An OPUS site category property may be attached to a root of the subsystem configuration at symbol 87. The site category may be instantiated at site category property 88 in OPUS XCM 45. A question of assigning a new name may be asked at symbol 89. If the answer is no, then a drop down list is shown at symbol 91. The list may be filled from a data store OPUS site category list 92 in the OPUS supervisor server 49. An existing name may be selected from the list at symbol 93. The name may be set to the site category property at symbol 94. The set name may be provided to site category property 88 at OPUS XCM 45. After symbol 94, then the approach may come to a stop 55.

However, if the answer to the question at symbol 89 of assigning a new name is yes, then the name text may be entered at symbol 95. The OPUS site category list 92 at OPUS supervisor server 49 may be appended with the new name from symbol 95. The name from symbol 95 may be set to the site category property at symbol 94. The set name may be provided to site category property 88 at OPUS XCM 45. After symbol 94, then the approach may come to a stop 55.

Figure 7:
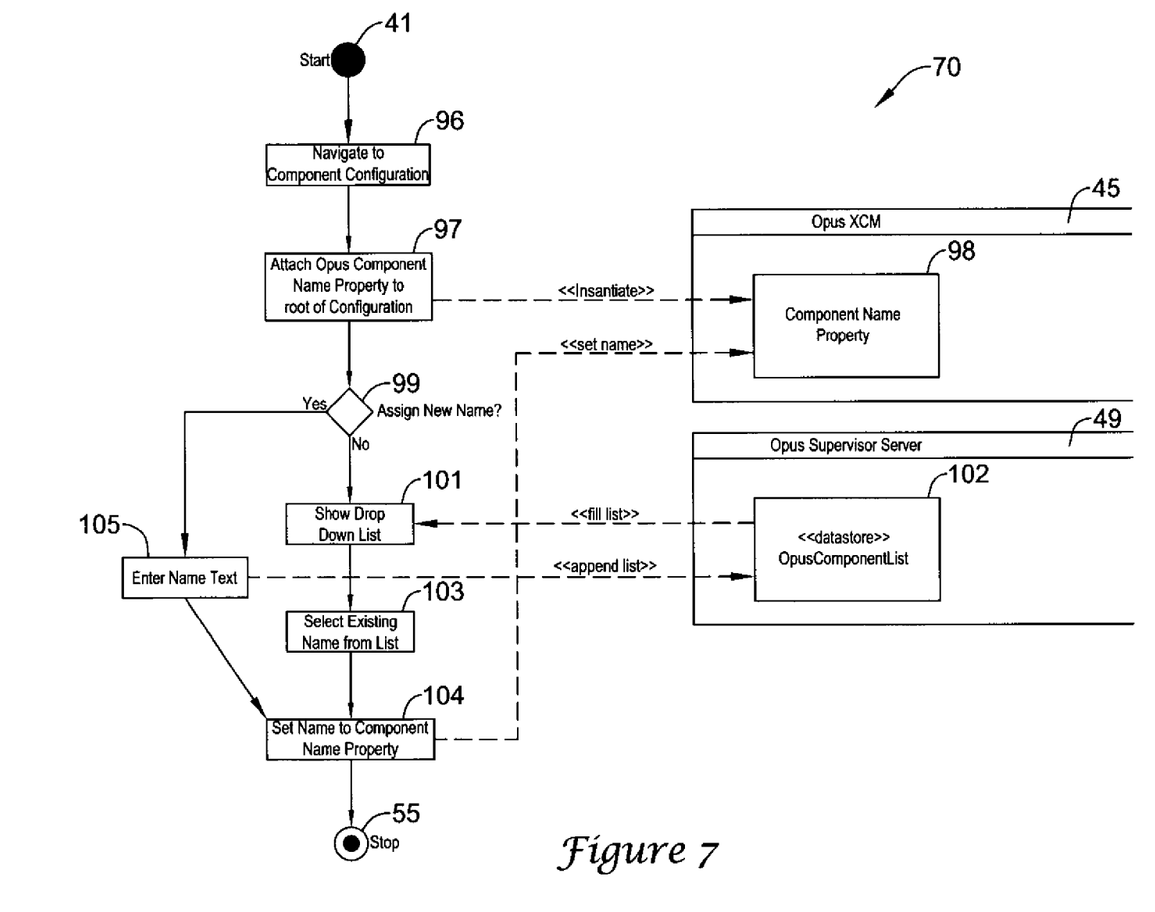
FIG. 7 is a diagram of a user interface and data flow for a user interface list control to set a component name.

FIG. 7 is a general diagram 70 which provides a user interface flow and data flow for using the OPUS user interface list control to set a component name. There may be a start 41 with navigation to a component configuration at symbol 96. A component name property may be attached to a root of the component configuration at symbol 97. The component name property may be instantiated at component name property 98 in OPUS XCM 45. A question of assigning a new name may be asked at symbol 99. If the answer is no, then a drop down list is shown at symbol 101. The list may be filled from a data store component list 102 in the OPUS supervisor server 49. An existing name may be selected from the list at symbol 103. The name may be set to the component name property at symbol 104. The set name may be provided to component name property 98 at OPUS XCM 45. After symbol 104, then the approach may come to a stop 55.

However, if the answer to the question at symbol 99 of assigning a new name is yes, then the name text may be entered at symbol 105. The component list 102 at OPUS supervisor server 49 may be appended with the new name from symbol 105. The name from symbol 105 may be set to the component name property at symbol 104. The set name may be provided to component name property 98 at OPUS XCM 45. After symbol 104, then the approach may come to a stop 55.

Some of the terms utilized herein may have corresponding designations as noted in the following: XCM station—site controller configuration; XCM auto discover service—site controller auto discovery service; XCM—site controller;

OPUS XCM—site controller; OPUS workbench—user interface (console); OPUS systems—enterprise site controllers (multi-site); OPUS supervisor station—supervisor data server; OPUS supervisor server—supervisor data server; OPUS supervisor—supervisor; OPUS group—site groups; OPUS explorer—site navigation tree; OPUS architect client—user interface (console); OPUS architect—user interface (console); OPUS—building management system (BMS); NIAGARA workbench—user interface (console); NIAGARA network—communication network; enterprise components—enterprise hierarchal elements; and enterprise—enterprise (business or customer) building site locations (all multi-site).

U.S. patent application Ser. No. 12/260,046, filed Oct. 28, 2008, and entitled "A Building Management Configuration System", may be pertinent to the present disclosure. U.S. patent application Ser. No. 12/260,046, filed Oct. 28, 2008, is hereby incorporated by reference.

In the present specification, some of the matter may be of a hypothetical or prophetic nature although stated in another manner or tense.

Although the present system has been described with respect to at least one illustrative example, many variations and modifications will become apparent to those skilled in the art upon reading the specification. It is therefore the intention that the appended claims be interpreted as broadly as possible in view of the prior art to include all such variations and modifications.

What is claimed is:

1. A method for controlling components at a user interface, comprising:
   navigating to a component configuration;
   attaching a component name property to a root of the component configuration;
   selecting a name for a component name property by choosing between options displayed on a user interface, where the displayed options include an option of entering text for a new name and an option of selecting an existing name from a list from a memory;
   appending the list if the text of the new name is entered; and
   setting the new name to the component name property and wherein:
   the component name property is instantiated in a site controller;
   the list is a drop down list stored in a supervisor data server;
   the name is set to the component name property in the site controller; and
   wherein getting to a component name property comprises:
      navigating to a component configuration;
      attaching a component name property to a root of the configuration; and
      instantiating the component name property at the site controller.

2. The method of claim 1, wherein each component has just one name.

3. The method of claim 1, wherein a component is a control entity.

4. The method of claim 1, wherein a component is a schedule entity.

5. The method of claim 1, wherein a component is an alarm type.

6. The method of claim 1, wherein a component is a point group.

7. The method of claim 1, wherein a component is a site category.

8. A user interface list control system comprising:
   a supervisor data server;
   a user interface console connected to the supervisor data server; and
   a site controller connected to the user interface console; and
   wherein:
   the supervisor data server comprises site groups;
   the site groups comprise a string list having a list of names;
   the user interface console comprises a plurality of user interface field editors each having a user interface combo box providing a text entry field and a drop down list of the list of names for allowing a user to select a name of a component from the list of names in the drop down list or if the name is not on the list of names, to enter the name of the component via text in the text entry field and save the entered name to the list of names;
   the site controller comprises a user interface list selector control and
   the user interface list selector control comprises:
      a control entity connected to the control entity user interface field editor;
      a schedule entity connected to the schedule entity user interface field editor;
      an alarm type connected to the alarm type user interface field editor;
      a point group connected to the point group field editor; and/or
      a site category connected to the site category field editor.

9. The system of claim 8, wherein the string list comprises:
   a control entity list;
   a schedule entity list;
   an alarm type list;
   a point group list; and/or
   a site category list.

10. The system of claim 9, wherein each instance of a control entity, schedule entity, alarm type, point group and/or site category has just one assigned name for selection of the instance.

11. The system of claim 9, wherein the plurality of user interface field editors comprises:
   a control entity user interface field editor connected to the control entity list;
   a schedule entity user interface field editor connected to the schedule entity list;
   an alarm type user interface field editor connected to the alarm type list;
   a point group field editor connected to the point group list; and/or
   a site category field editor connected to the site category list.

12. The system of claim 8, wherein the user interface list selector control further comprises:
   a control system connected to the control entity;
   a schedule connected to the schedule entity;
   an alarm extension connected to the alarm group type;
   a history extension connected to the point group; and
   a site connected to the site category.

13. A user interface list control system comprising:
   a user interface;
   a plurality of components;
   a supervisor server having a data store;
   a memory for holding a list of names assigned to components of the plurality of components;
   wherein:
   the memory holding the list is a data store;
   the user interface displays a plurality of options for selecting a name assigned to the component on the list of names, where the displayed options include an option of entering a new name for a component and an option of selecting an existing name from the list of names assigned to the components of the plurality of components;

a component is selected from the plurality of components with an entry at one of the options displayed on the user interface of a name assigned to the component;

selecting a component requires the entry of a name on the list of names;

if a new name is assigned to a component, the name is entered in the list of names as the only name assigned to the component a component is selected from a group consisting of a control entity, a schedule entity, an alarm type, a point group and a site category; and getting to a component name property comprises:
navigating to a component configuration; and
attaching a component name property to a root of the configuration; and
instantiating the component name property at the site controller.

14. The system of claim 13, wherein a component has only one name on the list names.

15. The system of claim 13, wherein a component comprises a component name property.

16. The system of claim 13, wherein name assigned to the component is set at the site controller.

* * * * *